(12) United States Patent
Ozawa et al.

(10) Patent No.: US 8,862,939 B2
(45) Date of Patent: Oct. 14, 2014

(54) NETWORK SYSTEM AND MANAGEMENT SERVER

(75) Inventors: Yoji Ozawa, Tokyo (JP); Eri Kawai, Yokohama (JP); Akihiro Koizumi, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 268 days.

(21) Appl. No.: 13/368,391

(22) Filed: Feb. 8, 2012

(65) Prior Publication Data

US 2012/0233503 A1 Sep. 13, 2012

(30) Foreign Application Priority Data

Mar. 10, 2011 (JP) ................................. 2011-052342

(51) Int. Cl.
*G06F 11/00* (2006.01)
*H04L 12/26* (2006.01)

(52) U.S. Cl.
CPC ............ *H04L 43/10* (2013.01); *H04L 43/0811* (2013.01)
USPC .............................................. 714/27; 714/43

(58) Field of Classification Search
CPC ............ G06F 11/2294; G06F 11/0748; G06F 11/0745
USPC .................... 714/27, 43; 370/241.1
See application file for complete search history.

(56) References Cited

U.S. PATENT DOCUMENTS

| 5,659,540 A * | 8/1997 | Chen et al. ..................... 370/249 |
| 6,873,598 B2 * | 3/2005 | Powers et al. ................. 370/248 |
| 7,168,011 B2 * | 1/2007 | Spies et al. ....................... 714/43 |
| 7,978,614 B2 * | 7/2011 | Wong et al. ................ 370/241.1 |
| 2009/0199047 A1 | 8/2009 | Vaitheeswaran et al. |
| 2011/0286324 A1 * | 11/2011 | Bellagamba et al. ......... 370/219 |

FOREIGN PATENT DOCUMENTS

| CN | 101616039 | 12/2009 |
| CN | 101933001 | 12/2010 |
| JP | 05-250186 A | 9/1993 |
| JP | 2004-134969 A | 4/2004 |

* cited by examiner

*Primary Examiner* — Philip Guyton
(74) *Attorney, Agent, or Firm* — Mattingly & Malur, PC

(57) ABSTRACT

A network system configured from a test device that executes a test including a continuity test and a performance test of a network configured from a plurality of transfer devices and a management server that requests an execution of the test for the test device, in this way, one or more backup session used for executing the test is selected from a plurality of sessions, the test is executed for a processing interval in a success, a next test is executed by the backup session when the processing time for the test exceeds over a specified time, thereby, a large number of tests can be executed and the test can be executed regularly even when the processing time becomes longer caused by a failure etc.

20 Claims, 20 Drawing Sheets

FIG. 3

| OAM DEVICE (INSIDE SITE) ID 5211 | CONNECTING EDGE NETWORK DEVICE ID 5212 | USER 5213 |
|---|---|---|
| 11 | 1 | A COMPANY |
| 12 | 1 | B COMPANY |
| 21 | 2 | A COMPANY |
| 22 | 2 | C COMPANY |
| ⋮ | ⋮ | |

FIG. 4

| MA ID 5221 | OAM DEVICE ID 5222 | PORT ID 5223 | MEP ID 5224 |
|---|---|---|---|
| 1 | 1 | 1 | 1011 |
| 1 | 11 | 1 | 11011 |
| 1 | 12 | 1 | 12011 |
| 2 | 1 | 1 | 1012 |
| 2 | 13 | 1 | 13011 |
| ⋮ | | | ⋮ |

FIG. 5

| OAM DEVICE ID 5231 | MANAGEMENT IP ADDRESS 5232 | Telnet ACCOUNT NAME 5233 | Telnet ACCOUNT PASSWORD 5234 | MAXIMUM MEMBER OF SESSION 5235 |
|---|---|---|---|---|
| 1 | 192.168.0.1 | user1 | pass1 | 5 |
| 2 | 192.168.0.2 | user2 | pass2 | 3 |
| --- | | | --- | --- |

FIG. 6

| OAM DEVICE ID ⌒5241 | SESSION ID ⌒5242 | REGULAR USE/ BACKUP ⌒5243 |
|---|---|---|
| 1 | 1 | REGULAR USE |
| 1 | 2 | REGULAR USE |
| 1 | 3 | REGULAR USE |
| 1 | 4 | REGULAR USE |
| 1 | 5 | BACKUP |
| 2 | 1 | REGULAR USE |
| ⋮ | | ⋮ |

FIG. 7

| TEST ID 5251 | CORE-NETWORK SIDE OAM DEVICE ID 5252 | SESSION ID 5253 | FRAME 5254 | TARGET OAM DEVICE ID 5255 | CONTENT 5256 | THRESHOLD 5257 |
|---|---|---|---|---|---|---|
| 1 | 1 | 1 | 1 | 11 | DELAY | 10msec |
| 2 | 1 | 1 | 2 | 21 | FRAME LOSS | 2frame/sec |
| 3 | 1 | 2 | 1 | 22 | DELAY | 20msec |
| 4 | 2 | 1 | 1 | 31 | DELAY | 25msec |
| --- | --- | | | | | |

FIG. 8

| TEST ID (5261) | NUMBER OF FAILURE (5262) | WEIGHT (5263) |
|---|---|---|
| 1 | 0 | 0 |
| 2 | 6 | 11 |
| 3 | 1 | 1 |
| 4 | 10 | 10 |
| ⋮ | | ⋮ |

FIG. 9

| LOG ID (5271) | GENERATION TIME (5272) | TEST ID (5273) | CONTENT (5274) |
|---|---|---|---|
| 1 | 2010-01-29 01:11:22 | 1 | SUCCESS |
| 2 | 2010-01-29 01:11:25 | 2 | FAILURE (THRESHOLD EXCESS) |
| 3 | 2010-01-29 01:11:22 | 3 | FAILURE (ACCESS FAILURE TO OAM DEVICE) |
| 4 | 2010-01-29 01:11:22 | 4 | SUCCESS |
| ⋮ | | | ⋮ |

FIG. 11

| MA ID (3211) | PORT ID (3212) | MEP ID (3213) |
|---|---|---|
| 1 | 1 | 1011 |
| 2 | 1 | 1012 |
| ⋮ | | ⋮ |

FIG. 13

ADD REGULAR TEST

ENTER CONTENT FOR ADDITIONAL REGULAR TEST

TARGET : SELECT DESTINATION FROM THE FOLLOWING LIST

| OAM DEVICE (INSIDE SITE) ID | USER |
|---|---|
| 11 | COMPANY A |
| 12 | COMPANY B |
| 21 | COMPANY A |
| ⋮ | ⋮ |

TEST TYPE : DELAY ▽

THRESHOLD : 10 msec

INTERVAL : 10 MINUTE

CANCEL          ADD

REGULAR TEST SCHEDULED ↓

ADDITION SUCCEEDED

REGULAR TEST ADDED
REGULAR TEST STARTED

OK

REGULAR TEST NOT SCHEDULED ↓

ADDITION FAILED

REGULAR TEST NOT ADDED
DELETE OTHER REGULAR
TEST OR ADD ON
OAM DEVICE

TEST SCHEDULE

REGULAR TEST REGISTERED IN PRESENT, AS FOLLOWS

| CORE-NETWORK SIDE OAM DEVICE | SESSION | FRAME | | | | | | | |
|---|---|---|---|---|---|---|---|---|---|
| | | 1 | 2 | 3 | 4 | 5 | 6 | 7 | 8 |
| 1 | 1 | 11 | 21 | — | — | 11 | 25 | 15 | — |
| | 2 | 22 | 12 | — | 33 | — | 14 | — | 16 |
| 2 | 1 | 31 | 32 | 23 | 13 | 24 | — | 34 | — |

THRESHOLD EXCESS

THRESHOLD EXCEEDED

TEST ID : 3
TARGET OAM DEVICE ID : 22
TEST TIME : 2010-01-29 14:40:22
DELAY : 50msec
(THRESHOLD : 20msec)

OK

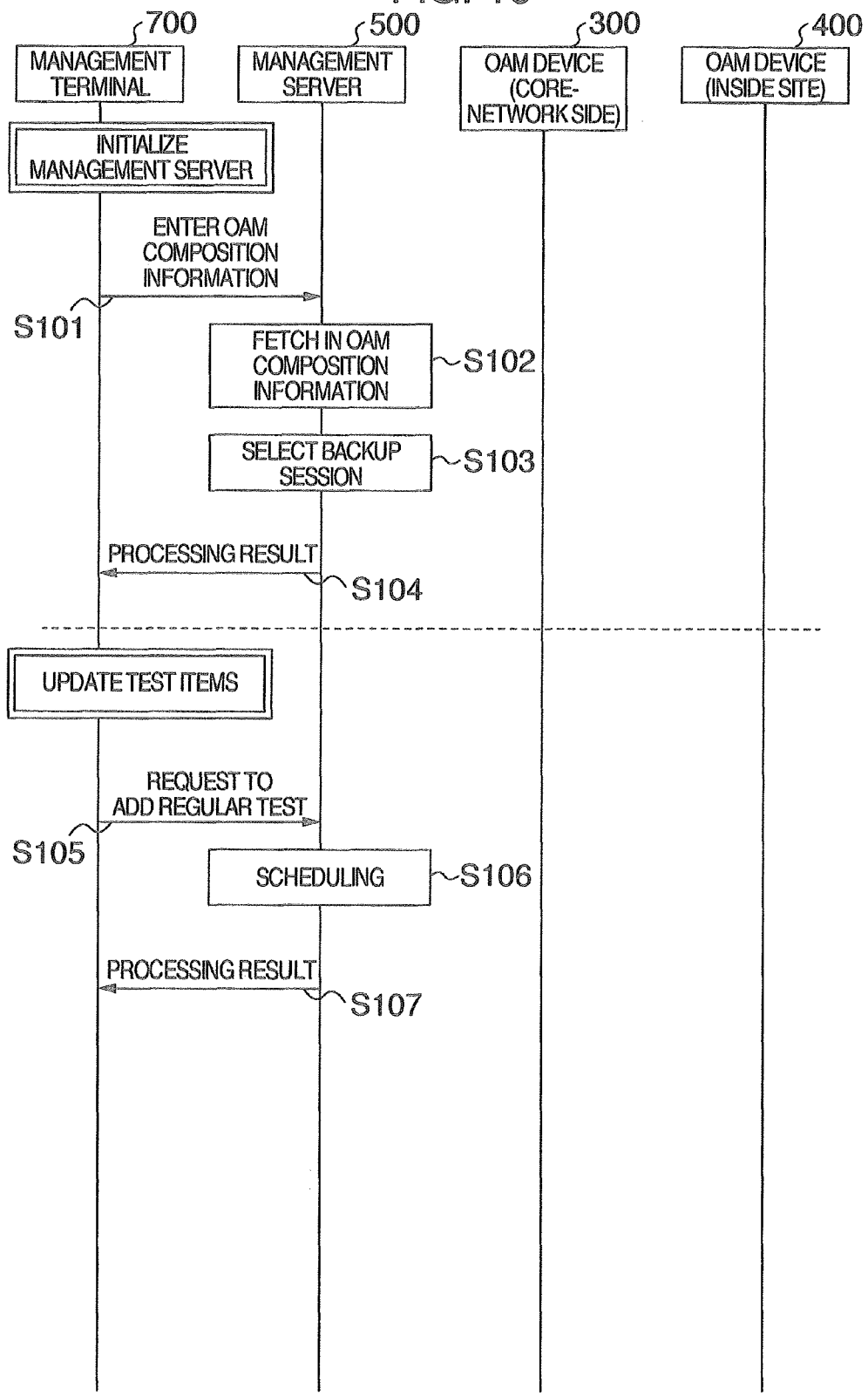

FIG. 17

| MESSAGE | TRANSMISSION SOURCE | DESTINATION | CONTENT | |
|---|---|---|---|---|
| ENTERING OAM COMPOSITION INFORMATION | MANAGEMENT TERMINAL | MANAGEMENT SERVER | • OAM DEVICE CONNECTION INFORMATION<br>• OAM COMPOSITION INFORMATION<br>• CORE-NETWORK SIDE OAM DEVICE ACCESS INFORMATION | ~S101 |
| PROCESSING RESULT | MANAGEMENT SERVER | MANAGEMENT TERMINAL | — | ~S104 |
| ADDITIONAL REQUEST FOR REGULAR TEST | MANAGEMENT TERMINAL | MANAGEMENT SERVER | • DESTINATION OAM DEVICE (INSIDE SITE)<br>• TEST TYPE<br>• THRESHOLD<br>• INTERVAL | ~S105 |
| PROCESSING RESULT | MANAGEMENT SERVER | MANAGEMENT TERMINAL | SCHEDULING SUCCEEDED OR FAILED | ~S107 |

FIG. 21

| MESSAGE | TRANSMISSION SOURCE | DESTINATION | CONTENT |
|---|---|---|---|
| TEST EXECUTION | MANAGEMENT SERVER | OAM DEVICE (CORE-NETWORK SIDE) | ○ MAID<br>○ DESTINATION MEP<br>○ TEST TYPE |
| TEST | OAM DEVICE (CORE-NETWORK SIDE) | OAM DEVICE (INSIDE SITE) | ○ TEST DATA |
| RESPONSE | OAM DEVICE (INSIDE SITE) | OAM DEVICE (CORE-NETWORK SIDE) | ○ RESPONSE TO TEST |
| TESTING RESULT | OAM DEVICE (CORE-NETWORK SIDE) | MANAGEMENT SERVER | ○ TESTING RESULT |

S401, S402, S403, S404

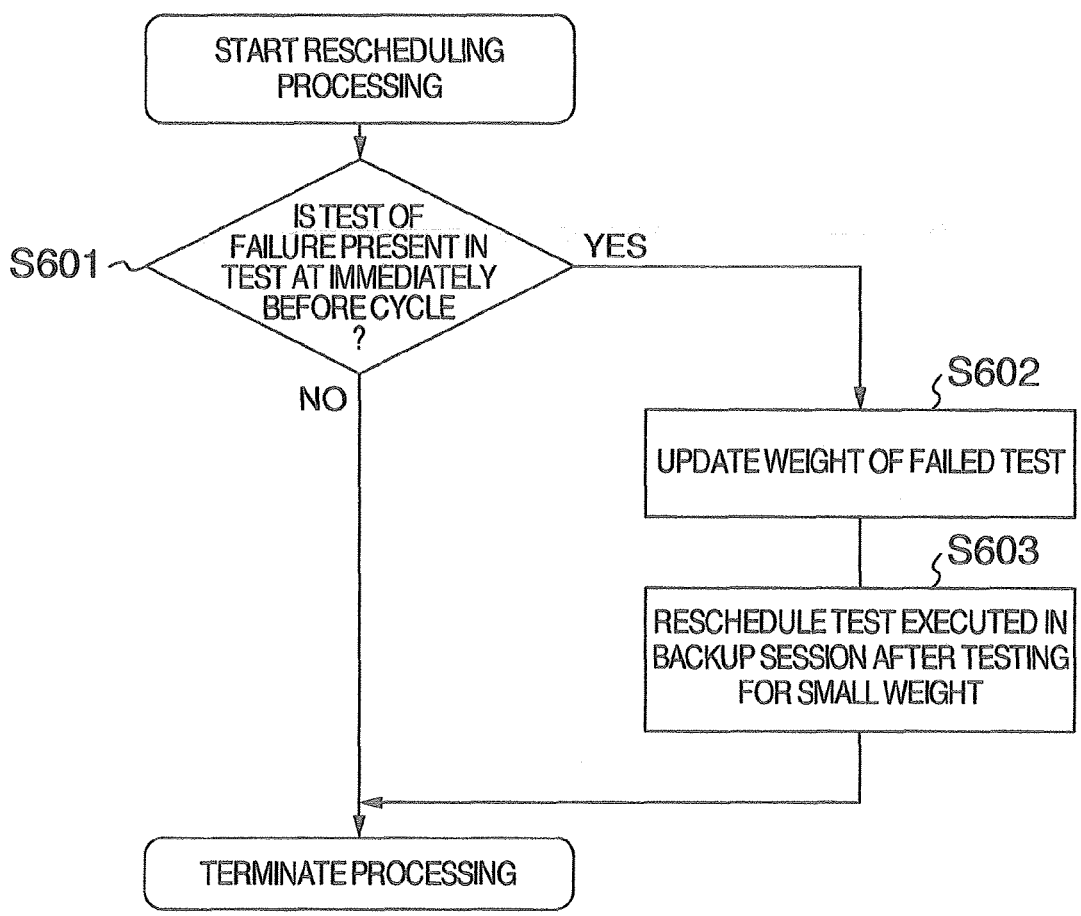

NETWORK SYSTEM AND MANAGEMENT SERVER

INCORPORATION BY REFERENCE

This application claims priority based on a Japanese patent application, No. 2011-052342 filed on Mar. 10, 2011, the entire contents of which are incorporated herein by reference.

BACKGROUND

The present invention relates to a network system, an OAM (Operations, Administration, Maintenance) regular test management server and a management method, and in particularly to an execution for scheduling a regular test, a test and a management of a testing result for the same configuration mentioned above.

Recently, a wide-area Ethernet service has been in widespread use, as a service for connecting inside sites distributed in a wide area by a network. Ethernet was originally a technique used for LAN (Local Area Network) and has been studied applying to a wide area network due to inexpensive cost for devices or any other reasons. One of problems of applying such a service to the wide area network was reliability thereof. For this reason of securing high reliability, an Ethernet OAM technique has been developed and standardized. The Ethernet OAM technique has been begun to widely apply to a network in business enterprises where the reliability is essential as well as to a wide area network for telecommunication firms.

The Ethernet OAM relates to a technique of streaming a test frame into a communication path through which user data also streams, to execute a continuity test and a performance test. In the wide-area Ethernet, a VLAN (Virtual LAN) is allocated to every user, and the test frame is streamed into the VLAN to execute the test on the communication path used also for the user data, so that a failure and performance monitoring can be executed accurately.

One of typically tested sections in Ethernet OAM is an access line for connecting between a core-network and a user inside site. The test is executed from an OAM device located in the core-network side to a device in the inside site when testing the access line. Several tens of thousands of devices are present in the inside site since they are corresponded to the number of access lines. In contrast, the number of OAM device is several in the core-network, therefore, it is required that the core-network side OAM device manages a number of devices in the inside site.

For a purpose of executing an OAM test, the OAM device is accessed by Telnet, SSH (Secure Shell) or the like, and a command is entered through a CLI (Command Line Interface). Normally, the number of session for the CLI to be able to connect simultaneously with a network device is as many as 3 to 16, and a number of the session is then limited to a number of the execution for testing the device in a large number of inside sites. In the case where the simultaneous connection of the session is realized by a number of CLI, a processing load becomes large, and it can be considered to be affected on a main signal. Therefore, it is hard that the number of session increases more than the present.

Presently, each of almost all the network devices incorporates the CLI, therefore, it is essential that the CLI is used for executing the OAM so that a large number of types of devices are targeted for management. In also the case where the network device incorporates a control IF (Interface) other than the CLI, the number of session is also limited.

In an applicative utilization method of the Ethernet OAM, there is a regular execution of the performance test, such as an LB (LoopBack), a DM (Delay Measurement) or the like. Unlike a CC (Continuity Check), the network device itself does not execute regularly the performance test such as the LB, DM or the like, but the performance test is executed by a chance given from a user. To this end, the performance test for the regular execution is realized by combining with, for example, a monitoring system. By executing the performance test regularly, it enables to monitor a segmentation of a monitoring section, an accurate performance measurement, etc. in high resolution. Therefore, there is an advantage that a failure handling can be speed up and a refund for an SLA (Service Level Agreement) violation can also be reduced.

When a monitoring result is submitted to a user as grounds of the SLA, it is important that the performance test is regularly executed for an accurate interval since information for a constant interval is required.

JP-A-2004-134969 discloses a system in which the OAM is executed regularly to suppress a size increase of a buffer memory used for receiving a control packet. But, the number of session of the CLI is limited for executing the performance test by using the above-mentioned Ethernet OAM. In consequence, it is difficult to execute a large number of tests regularly.

There has also proposed a method in which the test is executed for a shorter interval than a time in anticipation of a failure, as a method of executing the large number of tests within a limited execution session. But, a test time becomes longer in the failure and an execution interval varies, therefore, the regular execution cannot be carried through in an accurate interval.

JP-A-5-250186 discloses a system related to a task generation scheduling to generate a task for forcibly terminating when an execution time of the task is exceeded over a predetermined time. It is important to measure how long a delay is taken on the performance test, and the delay cannot be measured by causing the forcible termination. That is, it is important that the performance test should be executed through to completion even in the case where a processing time for the performance test becomes longer caused by the failure etc.

SUMMARY

In light of the mentioned above, an object of the invention is to provide a network system and a management server for executing the test regularly for a large number of devices in a limited execution session.

According to an aspect of the invention, a network is configured from a test device that executes a test including a continuity test and a performance test of a network configured from a plurality of transfer devices and a management server that requests an execution of the test for the test device. The management server has a control unit to select one session from a plurality of sessions to be connected to the test device, request an execution of a first test for the test device via a selected session, and request an execution of a second test to be executed after the first test for the test device via the session (backup session) different from the selected session among the plurality of sessions, when a response of a testing result of the first test is not received from the test device within a predetermined time period. The test device has a control unit to execute the test.

The control unit of the management server sets more than one session among the plurality of sessions in advance, as the backup session to be used for a transmission of the execution request for a test to be executed after the test, when the response of the testing result is not received from the test device within the predetermined time period.

The control unit of the management server sets the transmission timing of the execution request for the test in every session. The transmission timing of the execution request for the second test set at the transmission timing after the execution request for the first test in the selected session is set in the backup session, when the response of the testing result of the first test is not received from the test device within the predetermined time period.

The test device is configured from a first test device that receives the execution request for the test from the management server, a second test device to be addressed in a frame used for the test transmitted from the first test device, and the control unit of the management server sets by a timing different from the transmission timing of the execution request for the first test, when the transmission timing of the execution request for a third test to be addressed to the second test device connected with the transfer device identical with the transfer device connected with the second test device to be addressed in the frame used for the first test is set in the session.

The control unit of the management server calculates a probability, for every test, of when the response of the testing result is not received from the test device within the predetermined time period, to set the transmission timing of the execution request for a new test in accordance with the probability.

The control unit of management server sets a plurality of frames for setting the transmission timing of the execution request for the test for every session and sets the transmission timing of the execution request for a new test in the frame immediately after the frame in which the transmission timing of the execution request for the test is not set, among the plural frames.

According to the invention, a large number of regular monitoring can be realized by a less number of OAM devices when executing the continuity test and performance test for a large number of devices, so that the device cost for a core-network side OAM device can be reduced.

The regular monitoring can be executed for a constant interval, and a correctness of quality control in the network system can be improved.

The other objects, features and advantages of the invention will become apparent from the following description of the embodiments of the invention taken in conjunction with the accompanying drawings.

BRIEF DESCRIPTION OF THE DRAWINGS

FIG. 3 is an explanatory diagram for an OAM device connection information table 521 in the embodiment;

FIG. 4 is an explanatory diagram for an OAM composition information table 522 in the embodiment;

FIG. 5 is an explanatory diagram for a core-network side OAM device access information table 523 in the embodiment;

FIG. 6 is an explanatory diagram for an OAM device session information table 524 in the embodiment;

FIG. 7 is an explanatory diagram for a schedule information table 525 in the embodiment;

FIG. 8 is an explanatory diagram for a weight information table 526 in the embodiment;

FIG. 9 is an explanatory diagram for a testing result information table 527 in the embodiment;

FIG. 11 is an explanatory diagram showing an OAM composition information table 321 in the embodiment;

FIG. 13 is an explanatory diagram for a user interface on the management terminal 700, used for adding a regular test in the embodiment;

FIG. 14 is an explanatory diagram for the user interface on the management terminal 700, for displaying the regular test in the embodiment;

FIG. 15 is an explanatory diagram for the user interface on the management terminal 700, used for notifying a threshold excess in the embodiment;

FIG. 16 is a sequence diagram in an initialize management server and an update test items in the embodiment;

FIG. 17 is an explanatory diagram for messages to be transmitted and received in the initialize management server and the update test items in the embodiment;

FIG. 21 is an explanatory diagram for the messages to be transmitted and received in the execution of regular test in the embodiment;

FIG. 23 is a flowchart for a rescheduling processing in the embodiment.

DETAILED DESCRIPTION OF THE EMBODIMENTS

Figure 1:
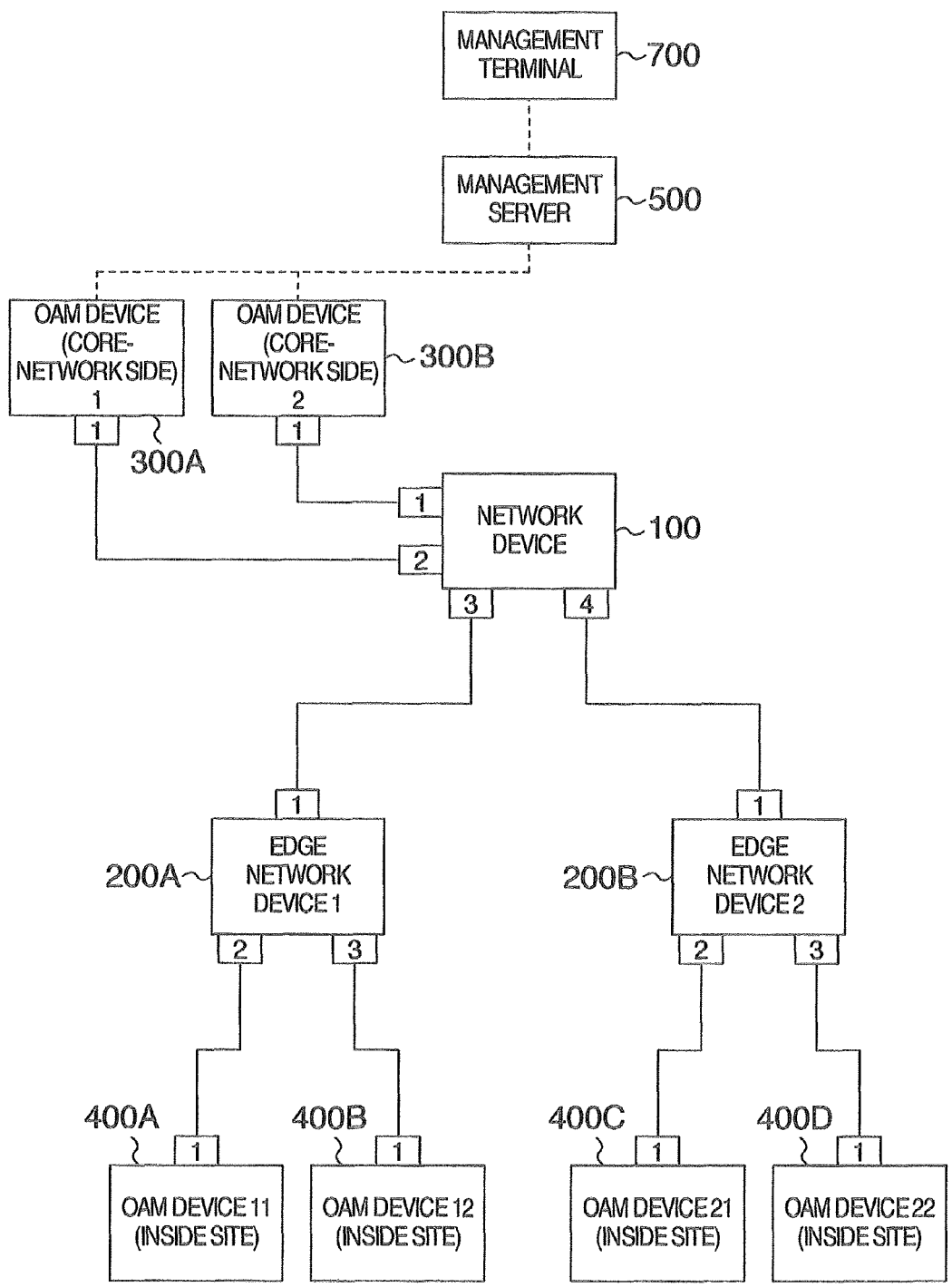
FIG. 1 is a configuration diagram showing a network system in an embodiment of the invention.

Hereinafter, embodiments will be described with reference to the drawings. FIG. 1 is a diagram showing a configuration of a network system in an embodiment of the invention. The network system provides a network device (transfer device) 100, edge network devices 200A, 200B, OAM (Operations, Administration, Maintenance) devices (core-network side) 300A, 300B, OAM devices (inside site) 400A to 400D, a management server 500 and a management terminal (operator management terminal) 700. In the following description, the edge network devices 200A, 200B are referred to as an edge network device 200 as a generic name, likewise, the OAM devices (core-network side) 300A, 300B are an OAM device (core-network side) 300, and the OAM devices (inside site) 400A to 400D are an OAM device (inside site) 400.

The management server 500 is a computer for managing the network device 100, edge network device 200, OAM device (core-network side) 300 and OAM device (inside site) 400. The management server 500 can communicate with the OAM device (core-network side) 300, network device 100 and edge network device 200, to request a test execution etc. for the OAM device (core-network side) 300. In FIG. 1, the management server 500 and OAM device (core-network side) 300 are connected with one network (illustrated by a dotted line) used physically for other management, but may be connected via the other network (illustrated by solid line) used for a service. The management server 500 will be described in detail later with reference to FIG. 2. The OAM device (core-network side) 300 and OAM device (inside site)

400 are a device for executing a test of an Ethernet OAM, that is, the test is executed between the OAM device and network device corresponding to the Ethernet OAM. In addition, the OAM device is not only a device for executing the Ethernet OAM, but also a device for executing Ping, Traceroute, etc. used for a continuity confirmation of an IP layer, and a system to be described below can be applied not only to the Ethernet OAM, but also to Ping etc.

Specifically, the OAM device (core-network side) 300 and OAM device (inside site) 400 are replaced with a Ping execution device (core-network side) and a Ping response device (inside site), respectively. In addition, a normal network device is replaced to these devices since it can execute the Ping execution and response. The execution of Ping is carried out in a CLI (Command Line Interface) in the Ping execution device (core-network side) likewise to the execution of an OAM test. There is no response for a constant time from Ping in a failure, likewise to the OAM test. Since a method of selecting a test execution frame and a processing in the failure is not depended on a command for the OAM test, the OAM test can also be applicable to Ping. The network device 100 is a device for transferring information to be communicated in the network to a target of that information, for example, a switch, a router, a transmission device, etc. The management terminal 700 is connected to the management server 500, for example. In addition, the number of network device 100, OAM device (core-network side) 300 and OAM device (inside site) 400 can be provided appropriately, which is not limited to the illustrated example.

Figure 2:
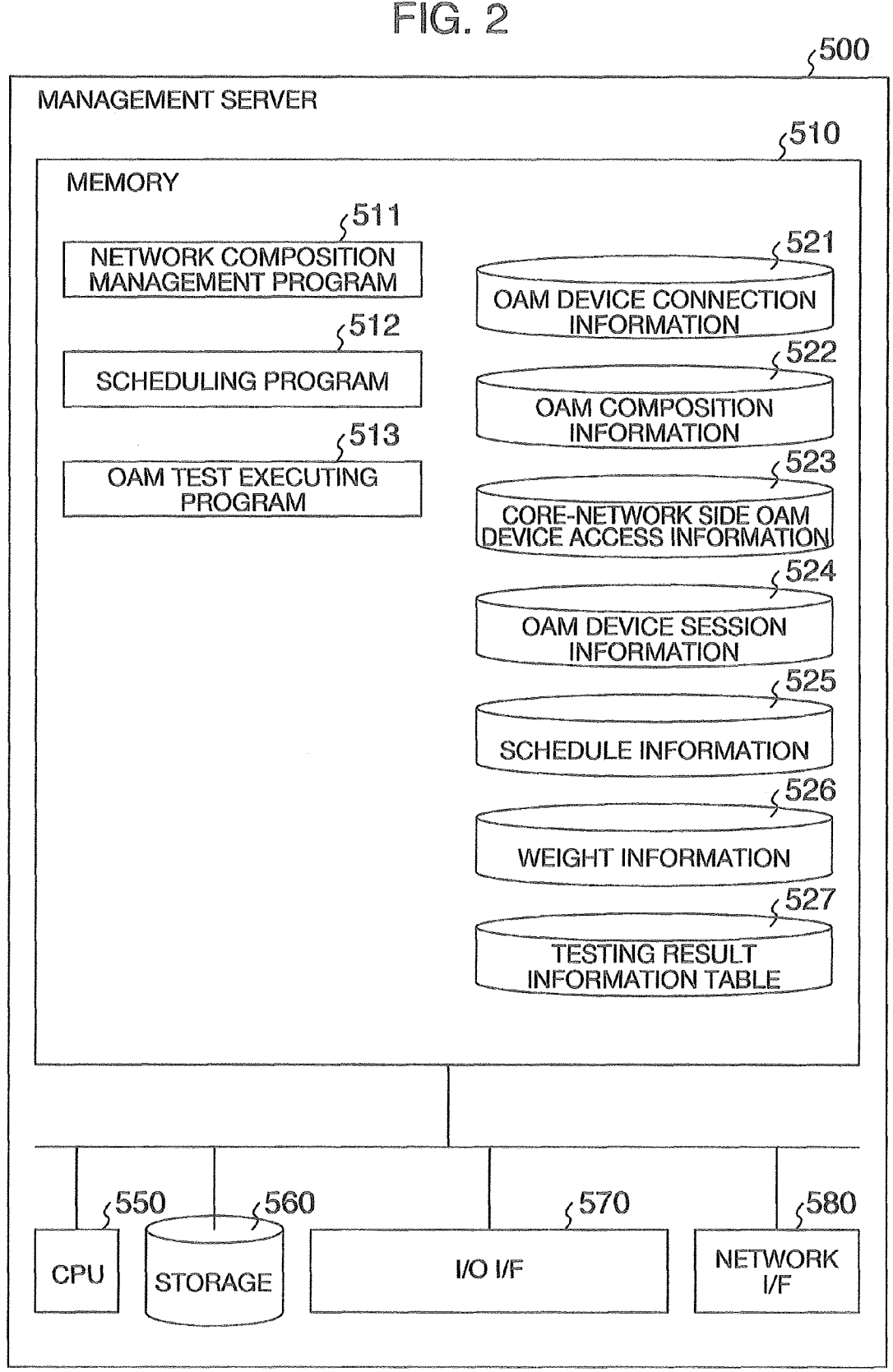
FIG. 2 is a block diagram showing a management server 500 in the embodiment.

FIG. 2 is a block diagram showing the management server 500 in the embodiment. The management server 500 provides, for example, a memory 510, a processing unit (CPU) 550, a storage 560, an I/O interface (I/F) 570 and a network interface (I/F) 580. The management server 500 transmits and receives information via other device (for example, OAM device (core-network side) 300 etc.) connected to the network and the network I/F 580. The memory 510 stores a network composition management program 511, a scheduling program 512, an OAM test executing program 513, an OAM device connection information table 521, an OAM composition information table 522, a core-network side OAM device access information table 523, an OAM device session information table 524, a schedule information table 525, a weight information table 526 and a testing result information table 527. In addition, the above-mentioned programs are executed by the CPU 550.

The network composition management program 511 stores the OAM device connection information, OAM composition information and core-network side OAM device access information, each of which are entered from a screen on the management terminal 700, in the respective tables. The scheduling program 512 schedules sessions in accordance with a processing flow in FIG. 19 when an additional regular monitoring is requested. The OAM test executing program 513 selects a session to be used, in accordance with a schedule generated by the scheduling program 512 to request an execution of the test for the OAM device (core-network side) 300 through the selected session. When a response is absent from the OAM device (core-network side) 300 within a specified time, a backup session managed in the OAM device session information table 524 is selected to save the execution request of next test in the backup session and send the execution request of next test to the OAM device (core-network side) 300 via the backup session. A method of selecting the backup session will be described in detail later with reference to FIG. 18. A manner of holding the selected backup session will also be described in detail later with reference to FIG. 6.

The OAM device connection information table 521 contains or manages connection information to be sent to the OAM device (inside site) 400 through the network device 100. The OAM device connection information table 521 will be described in detail later with reference to FIG. 3. The OAM composition information table 522 contains or manages OAM information, such as MEP (Maintenance End Point) for ports for the OAM devices 300, 400. The OAM composition information table 522 will be described in detail later with reference to FIG. 4. The core-network side OAM device access information table 523 contains or manages information for accessing to the OAM devices 300, 400 and information of maximum number of sessions accessible simultaneously to the OAM devices 300. The core-network side OAM device access information table 523 will be described in detail later with reference to FIG. 5. The OAM device session information table 524 contains or manages information for a method (regular use or backup) of using the session of the OAM device. The OAM device session information table 524 will be described in detail later with reference to FIG. 6. The schedule information table 525 contains or manages information for the scheduled test. The schedule information table 525 will be described in detail later with reference to FIG. 7. The weight information table 526 contains or manages weight information for every test. The weight information table 526 will be described in detail later with reference to FIG. 8. The testing result information table 527 contains or manages a testing result. The testing result information table 527 will be described in detail later with reference to FIG. 9.

The CPU 550 is a processor for executing the respective programs stored in the memory 510. The storage 560 is a device capable of storing the programs and various data, which can be configured by HDD (Hard Disk Drive). The I/O interface (I/F) 570 is an interface for input and output of data. The network I/F 580 is an interface for transmitting and receiving information to/from other OAM device 300 etc. connected with the network.

FIG. 3 is an explanatory diagram showing the OAM device connection information table 521 in the embodiment. The OAM device connection information table 521 contains, for example, an OAM device (inside site) ID 5211, a connecting edge network device ID 5212 and user information 5213.

The OAM device (inside site) ID 5211 is information for specifying the OAM device (inside site) 400. The connecting edge network device ID 5212 is information for specifying the edge network device 200 to connect with the OAM device (inside site) 400. The user information 5213 is information of users using the OAM device (inside site) 400.

FIG. 4 is an explanatory diagram showing the OAM composition information table 522 in the embodiment. The OAM composition information table 522 contains, for example, an MA (Maintenance Domain) ID 5221, an OAM device ID 5222, a port ID 5223 and an MEP (Maintenance End Point) ID 5224.

The MA ID 5221 is information for specifying the MA to which the MEP belongs. The OAM device ID 5222 is information for specifying the OAM devices 300, 400 having the MEP. The port ID 5223 is information for specifying a port in which the MEP is set. The MEP ID 5224 is information for specifying the MEP and is used for addressing a destination of the OAM test.

FIG. 5 is an explanatory diagram of the core-network side OAM device access information table 523 in the embodiment. The core-network side OAM device access information table 523 contains, for example, an OAM device ID 5231, a management IP address 5232, a Telnet account name 5233, a Telnet account password 5234 and a maximum number of sessions 5235 connectable simultaneously to the OAM devices (core-network side) 300.

The OAM device ID 5231 is information for specifying the OAM device 300. The management IP address 5232 is information to be used as an access target when accessing remotely to the OAM device 300. The Telnet account name 5233 is account information for executing a login by a remote access. The Telnet account password 5234 is password information for executing the login by the remote access. The maximum number of sessions 5235 is information of the number of session to be allowed for executing simultaneously test commands by the OAM devices 300.

FIG. 6 is an explanatory diagram of the OAM device session information table 524 in the embodiment. The OAM device session information table 524 contains, for example, an OAM device ID 5241, a session ID 5242 and a regular use/backup 5243.

The OAM device ID 5241 is information for specifying the OAM device 300. The session ID 5242 is information for specifying the session in the OAM device 300. The regular use/backup 5243 is information for discriminating whether the session is used as a regular use session or a backup.

FIG. 7 is an explanatory diagram of the schedule information table 525 in the embodiment. The schedule information table 525 contains, for example, a test ID 5251, a core-network side OAM device ID 5252, a session ID 5253, a frame 5254, a target OAM device ID 5255, a content 5256 and a threshold 5257.

The test ID 5251 is information for specifying a test. The core-network side OAM device ID 5252 is information for specifying the OAM device (core-network side) 300 as an execution source of the test. The session ID 5253 is information for specifying the session to be executed for the test. The frame 5254 is information for specifying a frame to be executed for the test. The number of frame is equivalent to (time for a cycle)÷(time for one frame), where the time for cycle is determined from an interval, and a frame is generated from the time for cycle (the time for one frame is designated by a setting file etc., and the cycle will be described later). The frames are lined up in a time series, and the test present in the frames is executed in that order. The test is also executed by the number of sessions in the same frame. The target OAM device ID 5255 is information for specifying the OAM device (inside site) 400 as a destination of test. The content 5256 is information indicating a test type of the content, for example, "delay" and "frame loss," etc. The threshold 5257 is information of a threshold for determining that the test is failed.

FIG. 8 is an explanatory diagram of the weight information table 526 in the embodiment. The weight information table 526 contains, for example, a test ID 5261, number of failure 5262 and a weight 5263.

The test ID 5261 is information for specifying the test appended with a weight. The number of failure 5262 is number of times of when the testing result became a failure. The weight 5263 is weight information appended to the test. The higher the weight tends possibly to be failed, the larger the value becomes. A method of appending the weight is expressed by the following manner, that is, the failure occurred at an immediately before test is considered to be important, and (when the last test is failed), weight=number of failure times+coefficient, and (when the last test is succeeded), weight=number of failure times, etc. FIG. 8 shows the case where the coefficient=5. Therefore, a test ID 2 indicates that weight=6+5=11 since the last test is failed, and a test ID 3 indicates that weight=1 since the last test is succeeded.

FIG. 9 is an explanatory diagram of the testing result information table 527 in the embodiment. The testing result information table 527 contains, for example, a log ID 5271, a generation time 5272, a test ID 5273 and a content 5274.

The log ID 5271 is information for specifying a log. The generation time 5272 is a time when the log is generated. The test ID 5273 is information for specifying the test of a log target. The content 5274 is a content of the testing result of the log target.

Figure 10:
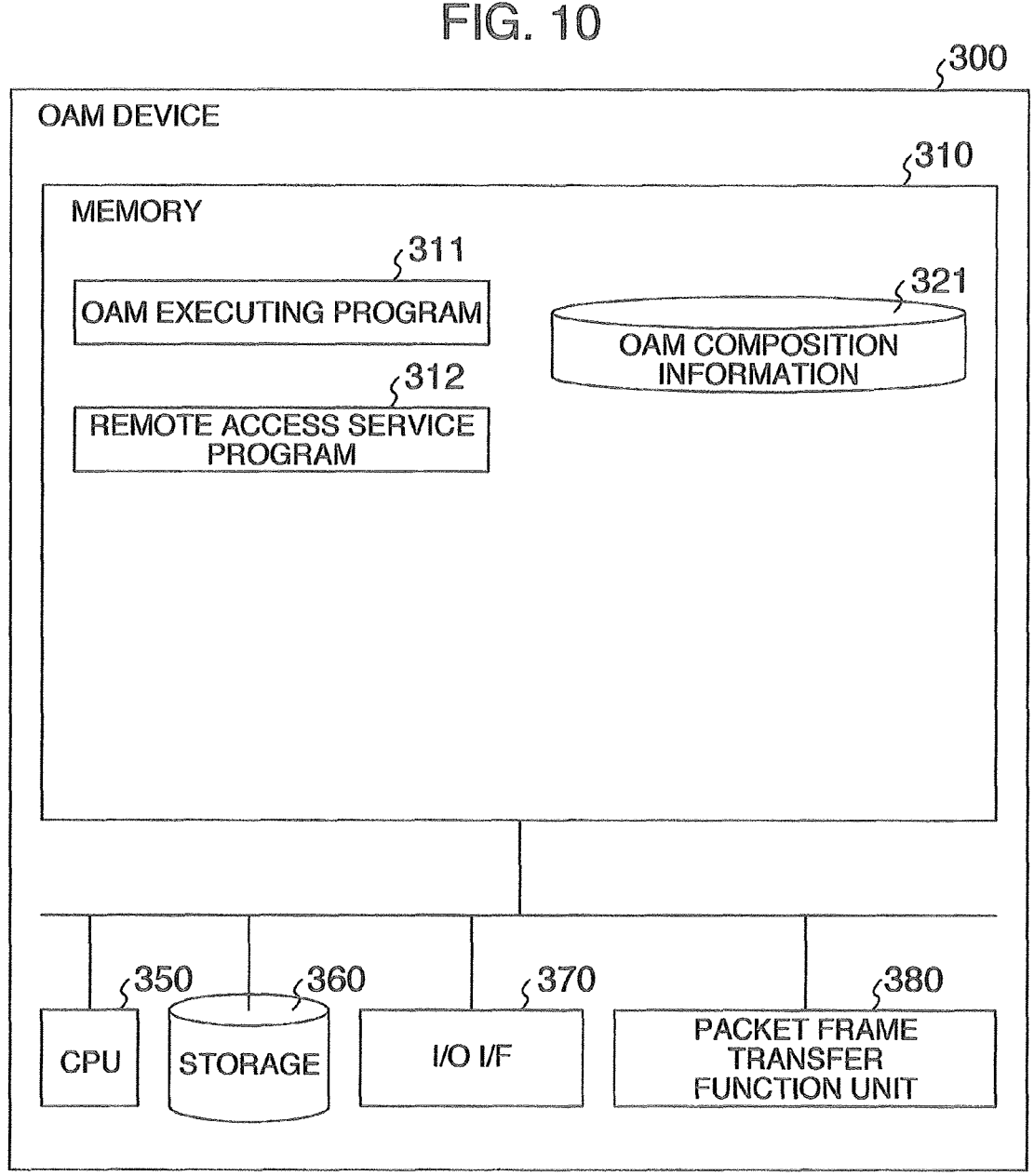
FIG. 10 is a block diagram showing an OAM device 300 in the embodiment.

FIG. 10 is a block diagram of the OAM device (core-network side) 300 in the embodiment. The OAM device (core-network side) 300 provides, for example, a memory 310, a processing unit (CPU) 350, a storage 360, an I/O interface (IX) 370 and a packet frame transfer function unit 380. In addition, FIG. 10 shows the OAM device (core-network side) 300, but the OAM device (inside site) 400 is also the same configuration shown therein.

The memory 310 stores, for example, an OAM executing program 311, a remote access service program 312 and an OAM composition information table 321. In addition, the respective programs are executed by CPU 350.

The OAM executing program 311 executes an OAM test to receive an OAM frame from other OAM device and respond from it. The remote access service program 312 accepts an access to the OAM device 300 remotely by Telnet, SSH (Secure Shell), etc. The OAM composition information table 321 manages OAM composition information, such as the MEP, MA, etc. set in the port. The OAM composition information table 321 will be described in detail below with reference to FIG. 11.

FIG. 11 is an explanatory diagram of the OAM composition information table 321 in the embodiment. The OAM composition information table 321 contains, for example, an MAID 3211, a port ID 3212 and an MEP ID 3213.

The MAID 3211 is information for specifying the MA to which the MEP belongs. The port ID 3212 is information for specifying a port in which the MEP is set. The MEP ID 3213 is information for specifying the MEP.

Figure 12:
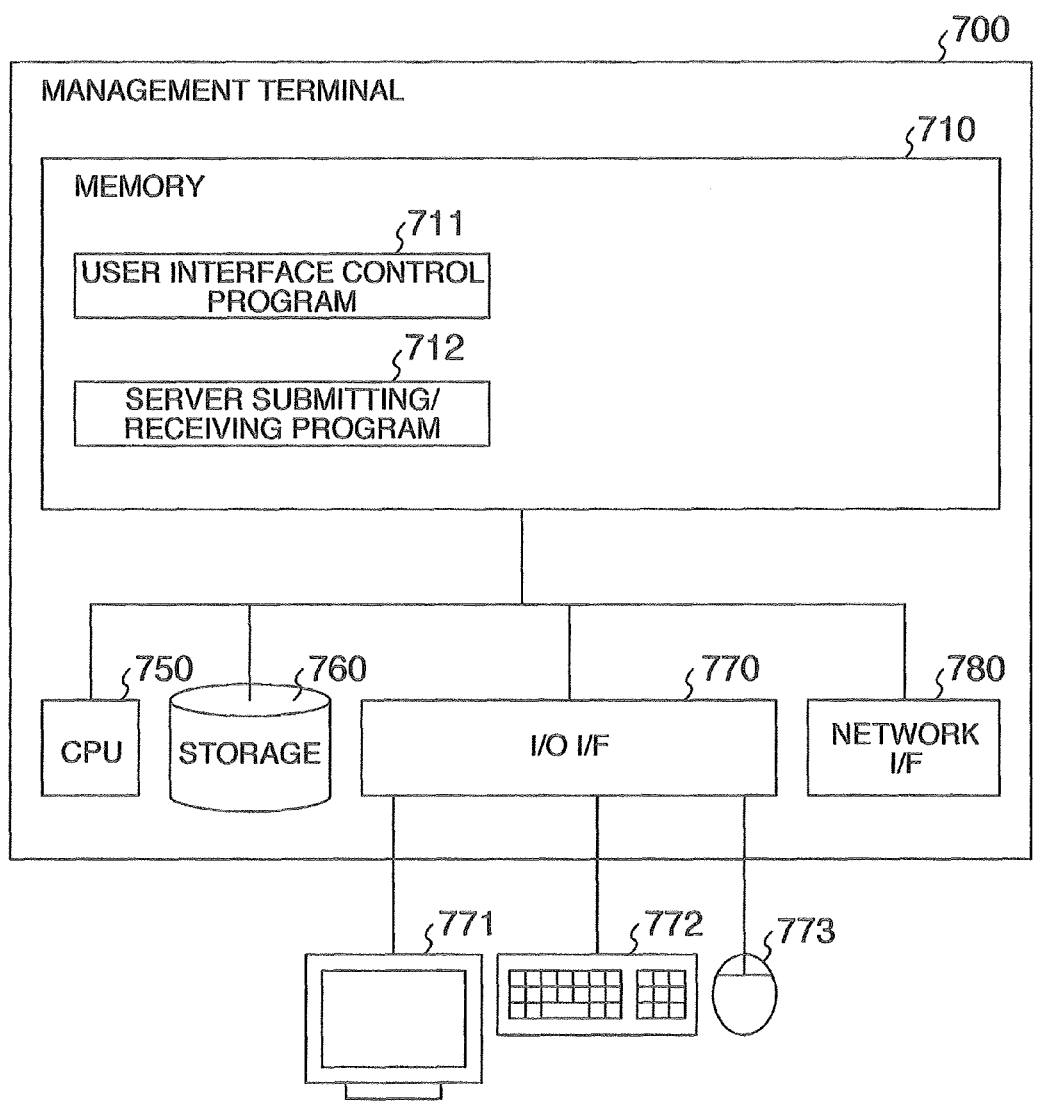
FIG. 12 is a block diagram showing a management terminal 700 in the embodiment.

FIG. 12 is a block diagram of the management terminal 700 in the embodiment. The management terminal 700 provides, for example, a memory 710, a processing unit (CPU) 750, a storage 760, an I/O interface (I/F) 770 and a network interface (I/F) 780. The management terminal 700 transmits and receives information via other device (for example, the management server 500 etc.) to be connected with a network and the network I/F 780. The memory 710 stores, for example, a user interface control program 711 and a server transmission/reception program 712. In addition, the respective programs are executed by the CPU 750.

The user interface control program 711 is executed to display information on a screen display device 771 and acquire input information. The server submitting/receiving program 712 transmits the input information to the management serve 500 and receives a response of that.

The CPU 750 is a processor for executing the programs stored in the memory 710. The storage 760 is a device capable of storing the programs and various data, for example, can be configured by HDD (Hard Disk Drive). The I/O interface (I/F) 770 is an interface used for input and output for data. The I/O interface (I/F) 770 is connected with the screen display device 771, a keyboard 772 and a mouse 773. The information received from the management server 500 is displayed on the screen display device 771, and a user enters the information from the keyboard 772 and mouse 773. The network I/F 780 is an interface for transmitting or receiving the information to/from the management server 500 etc. connected with the network. FIG. 13 is an explanatory diagram for a user interface, in the management terminal 700, used for adding a regular test. The user corresponding to the OAM device ID of a target, a test type (delay measurement, frame loss measurement, etc.), a threshold for determining the failure and interval, can be entered through the user interface. When an additional regular test is finished scheduling successfully, a notification as started the regular test in accordance with the schedule, is sent to the management server 500. The notification is also sent to it when the scheduling is failed.

FIG. 14 is an explanatory diagram of the user interface for displaying the regular test registered on the management terminal 700. Frames correspond to every session in each of the core-network side OAM devices, and each of the frames represents the ID of OAM device (inside site) to be tested. For example, in the session 1 of the core-network side OAM device 1, the frame 1 designates an OAM device (inside site) 11 to be tested, and the frame 2 designates an OAM device (inside site) 21 to be tested.

A time for one frame is equivalent to about a processing time in the success shorter than the processing time in the failure. The test is executed for the above-mentioned interval, so that the number of test execution can be increased drastically.

FIG. 15 is an explanatory diagram for the user interface for notifying a threshold excess to an operator, when the regular test exceeds over the threshold. The notification passed through the user interface contains a test ID, a target OAM device ID, a test time, and a delay or number of frame loss.

FIG. 16 is a sequence diagram for the initialize management server and the update test items in the embodiment. FIG. 17 is a diagram for explaining messages to be transmitted or received in the initialize management server and the update test items in the embodiment.

A description will be concerned with the initialize management server. First, the management terminal 700 sends the OAM device connection information, OAM composition information and core-network side OAM device access information to the management server 500, at a step S101. The management server 500 fetches in the information received from the management terminal 700 to store respectively in the OAM device connection information table 521, OAM composition information table 522 and core-network side OAM device access information table 523, at a step S102. In addition, the acquisition of OAM composition information may be executed by means such as SNMP (Simple Network Management Protocol) etc. from an actual device. The management server 500 selects a backup session from the fetched core-network side OAM device access information, at a step S103. This processing will be described in detail later with reference to FIG. 18. The management server 500 transmits a processing result to the management terminal 700, at a step S104.

Next, a description will be concerned with a sequence in the update test items. The management terminal 700 requests an additional regular test to the management server 500, at a step S105. The management server 500 schedules the regular test in accordance with the requested content, at a step S106. This processing will be described in detail later with reference to FIG. 19. The management server 500 notifies the scheduled result (scheduling succeeded or failed) to the management terminal 700, at a step S107. In addition, a deletion and changeover processing of the regular test is also executed by the same sequence in FIG. 16.

Figure 18:
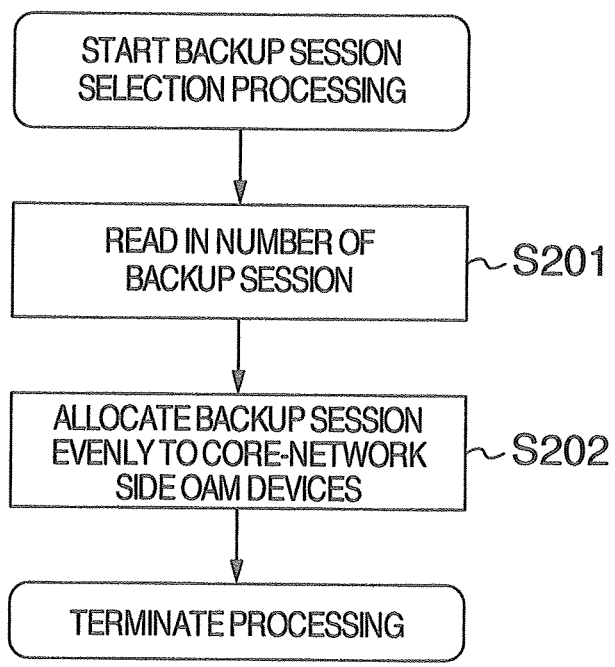
FIG. 18 is a flowchart for a backup session selection processing in the embodiment.

FIG. 18 is a flowchart of a backup session selection processing. The management server 500 reads in the number of backup session from a setting file, at a step S201. In addition, the number of backup session may use information entered from the user interface of the management terminal 700. The backup session is allocated evenly to the core-network side OAM devices, at a step S202, and the processing is then terminated. In addition, the backup session may be shared with the plural units of OAM devices. In this way, more number of sessions is used as regular use sessions, so that more number of tests can be executed.

Figure 19:
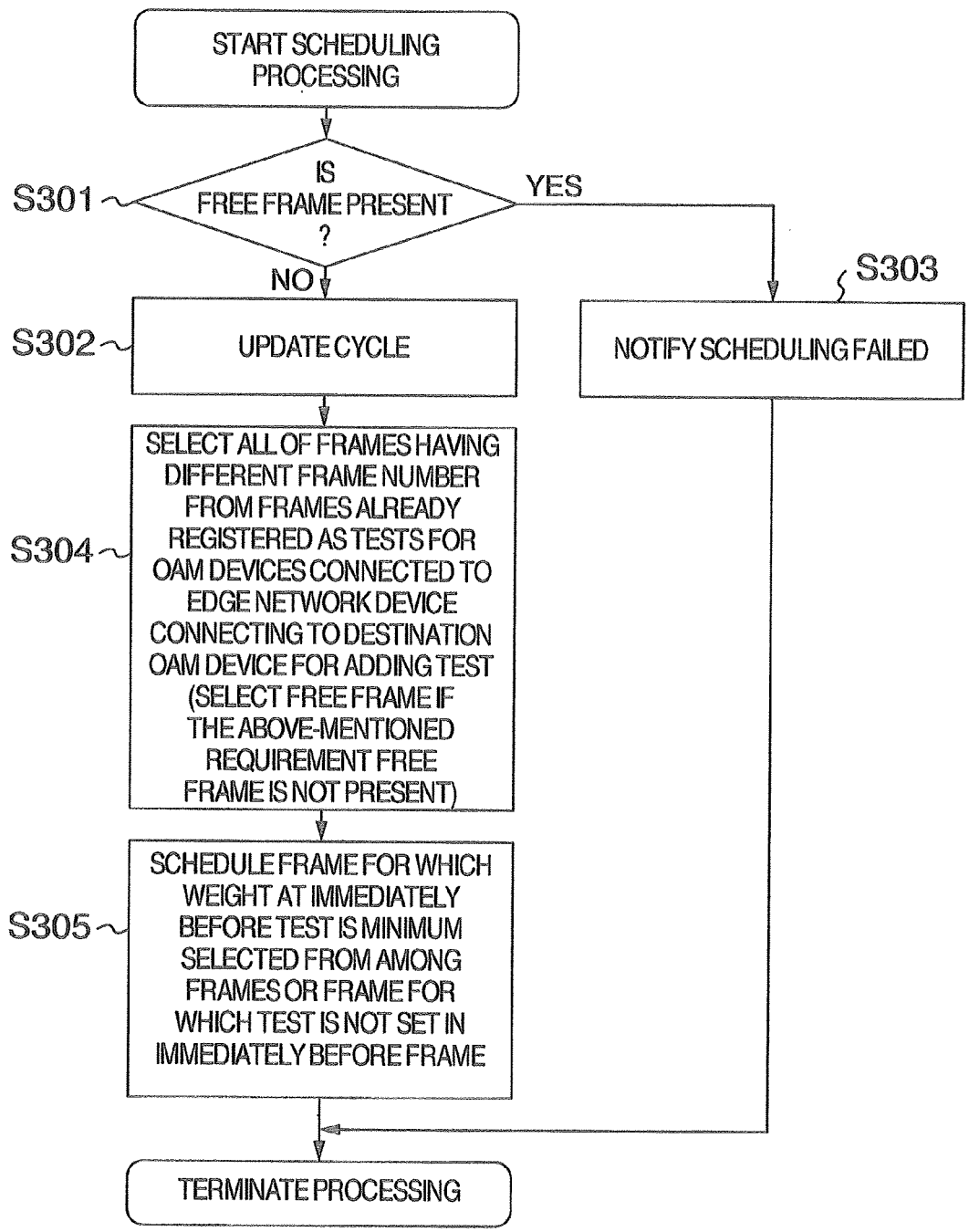
FIG. 19 is a flowchart for a scheduling processing in the embodiment.

FIG. 19 is a flowchart for a scheduling processing. The management server 500 confirms whether a free frame is present in the regular use session, at a step S301. A scheduling failed is notified to the management terminal 700, at a step S303 if the free frame is not present, and the processing is terminated. A cycle is updated, at a step S302 if the free frame is present.

The cycle is a time period for which all of the registered regular tests are repeated as the same fashion. For example, the time period of the frames 1 to 8 becomes one cycle when the test (execution request for the test) is scheduled as shown in FIG. 14. The time period (test time required for when a failure is not detected in the network) approximately required for processing the test in the success is set in the respective frames in advance. For example, a timing of the test (execution request for the test) set in the frame of the same number between the sessions is the same when the test (execution request for the test) is scheduled as shown in FIG. 14. A lowest common multiple of an additional interval and an existing cycle is set in a new cycle when adding a new test. When the cycle becomes long, the existing test is added to the added frame such that the test is repeated regularly.

Of the free frames, all of the frames having different frame number of the frames already registered as tests for the OAM devices connected with the edge network device connecting to a target OAM device for an adding test, are selected at a step S304. This means that the test for the OAM devices connected with the same edge network device all becomes failure, when the failure occurs between the core-network side OAM device and edge network device. That is, the test set in the same frame (the same number frame) between the sessions is requested as execution for the OAM device from the management server 500 at the same timing and is executed at the same timing. Therefore, there would be possibility that the number of backup session for saving the next test is not enough when the plural tests become failure in the same frame. For this reason, the test having high possibility to become failure at the same time is scheduled to other frames (each of which belongs to a different number frame). In this way, a large number of tests can be executed effectively by a less number of backup sessions. In addition, when there is no free frame in the different number frame, the free frame of the same frame number is selected.

Figure 20:
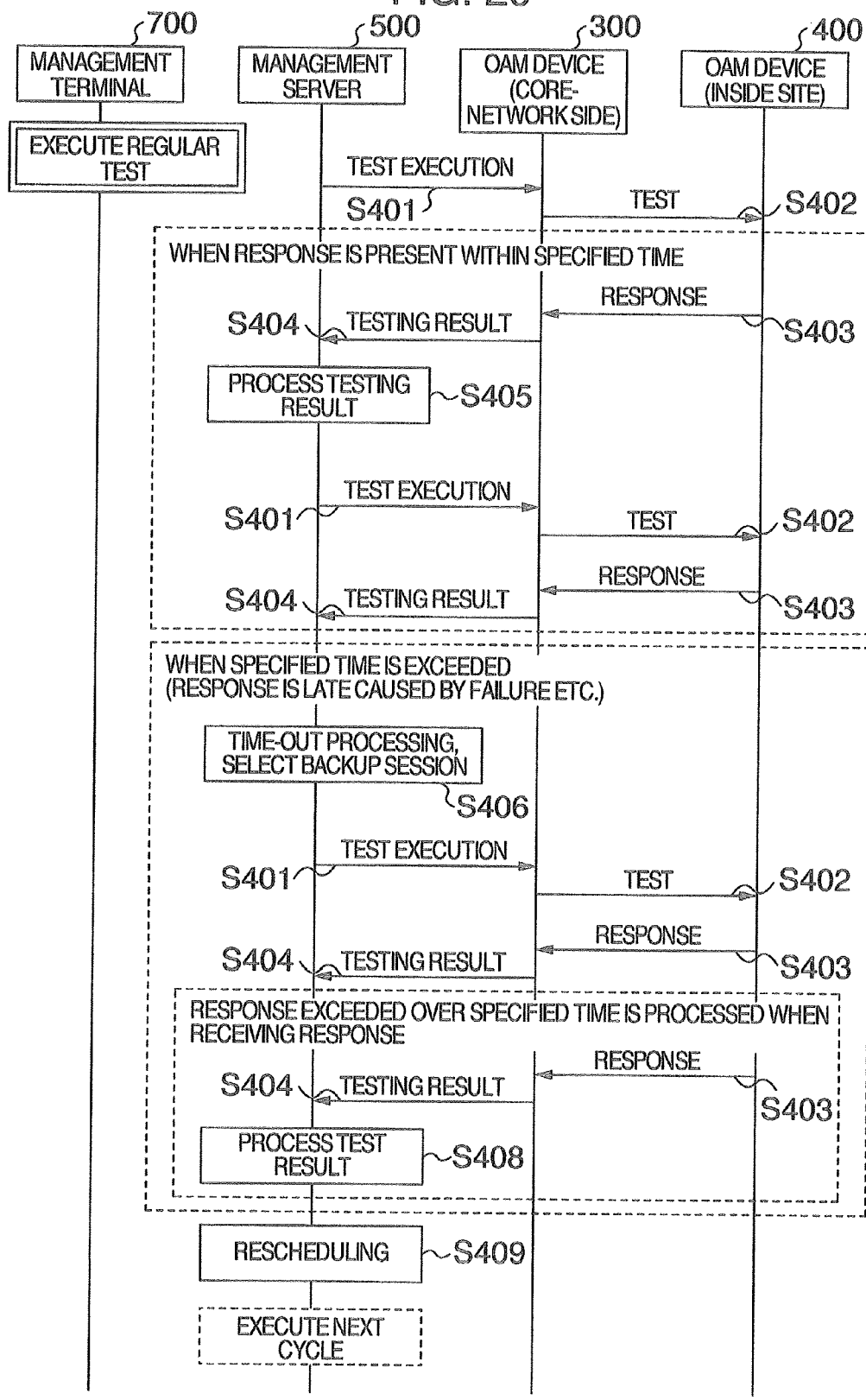
FIG. 20 is a sequence diagram in an execution of the regular test in the embodiment.

The frame for which the test is not set in the immediately before frame among the selected frames or the frame for which the weight of test set in the immediately before frame is minimum, is selected to schedule the test, at a step S305. The higher the weight of test tends possibly to be failed, the larger the value becomes. When the test becomes failure, the test next from that test is required to save in the backup session. The scheduling is applied to the frame for which the test is not set in the immediately before frame or the frame for which the weight of test set in the immediately before frame is minimum so that the save is not executed as much as possible. FIG. 20 is a sequence diagram in the execution of regular test in the embodiment. FIG. 21 is a diagram for explaining messages to be transmitted or received in the execution of regular test in the embodiment. The management server 500 requests the test execution for the OAM device (core-network side), at a step S401. The test execution request contains the MA ID, target MEP and test type. The OAM device (core-network side) executes the requested test type for the OAM device (inside site) having the target MEP in the requested MA, at a step S402. FIG. 20 illustrates the processing for one session only, but the OAM device (core-network side) can execute the test for the plural number of sessions in parallel.

After executing the test, there are two cases: a response is present from the target OAM device within a specified time; and the response is absent within the specified time, caused by the failure etc. The processing is therefore different for each of the cases.

The sequence will be described for the case where the response is present within the specified time.

The OAM device (core-network side) receives the response at a step S403, to notify a testing result to the management server 500, at a step S404. The testing result is represented by a character string displayed on the CLI.

The management server 500 holds the testing result on the basis of the received information and executes a notification etc. to the operator when exceeding over the threshold, at a step S405. Thereafter, the next test is executed when a start time comes for it.

Next, the sequence will be described for the case when exceeding over the specified time. The management server 500 times out at when the response is not returned within the specified time and selects the backup session for executing the next test at an appointed time, at a step S406. This processing will be described in detail later with reference to FIG. 22. By executing the next test in the backup session, the next test can be executed at the appointed time even though the processing time becomes long caused by the failure, and a large number of tests can be executed while monitoring regularly and accurately.

The test execution is requested to the OAM device (core-network side) so as to execute the next test in the selected backup session, at the step S401. The subsequent processing is the same as the above-mentioned processing at the step S402.

The processing for the response exceeded over the specified time is executed at the time of receiving the response. The processing after receiving (at the step S403) the response by the OAM device (core-network side) is the same as that at the steps S403 to S408 (same processing at the step S405).

After executing the test for one cycle, a rescheduling is executed for the test next from the test exceeded over the specified time at the immediately before cycle, at a step S409. This processing will be described in detail later with reference to FIG. 23. Thereafter, the test is executed for the next cycle.

Figure 22:
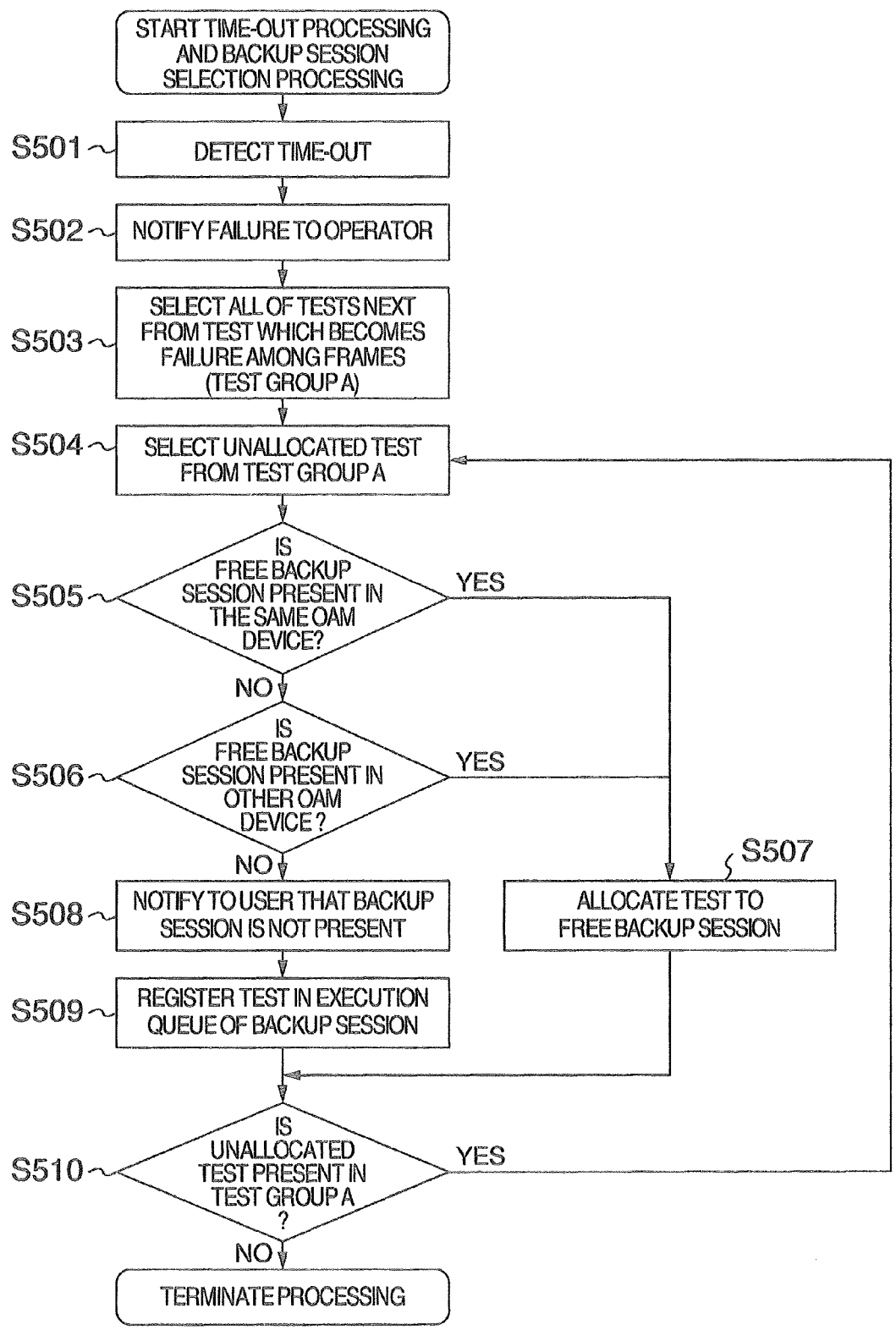
FIG. 22 is a flowchart for a time-out processing and a backup session selection processing in the embodiment.

FIG. 22 is a flowchart of a time-out processing and a processing for selecting the backup session.

The management server 500 detects a time-out at a step S501, to notify a test failure to the operator, at a step S502. For example, this notification is indicated by a display on the screen of management terminal 700 in FIG. 15, by a mail, a rotating warning siren light, etc.

Afterward, the selection processing for the backup session is executed. All of the tests are selected next from the tests which become the test failure among the frames, at a step S503. Here, the selected tests are referred to as a test group A. The test not allocated to other session is selected from the test group A, at a step S504. It is confirmed that whether a free backup session is present in the same OAM device, at a step S505. The selected test is allocated to that backup session, at a step S507, if it is present. If it is not present, it is confirmed that whether the free backup session is present in other OAM devices, at a step S506. If it is present at the step S506, the selected test is allocated to the backup session, as the same processing at the step S507. If it is not present, it is notified to the user that the backup session is not present, at a step S508. The number of tests allocating this test is registered in an execution queue for the minimum backup session, at a step S509. The number of test is registered in the execution queue even in the case where the backup session is not present, therefore, the test can be executed after short delay, the test cannot however be executed for an accurate interval.

The selected test is allocated to the free backup session, or it is confirmed that whether an unallocated test is present in the test group A, after registering in the execution queue, at a step S510. The processing returns to the step S504 if it is present. If it is not present, the processing terminates since all of the tests next from the failed test are allocated to the backup session.

FIG. 23 is a flowchart of the rescheduling processing. It is confirmed that whether the test failure is present in the test at the immediately before cycle, at a step S601. The processing terminates if the failed test is not present. If it is present, the weight of the failed test is updated, at a step S602. The higher the weight tends possibly to be failed, the larger the value becomes. A method of updating the weight corresponds to a method of giving importance to the immediately before failure etc. The test executed in the backup session is rescheduled at after the test for small weight, at a step S603, and the processing terminates.

Here, the number of units of the core-network side OAM devices is indicated below as an example. Assuming that the OAM device in the inside site as test target is 10000 units, the interval of one test is 20 minutes, the test processing time in success is 2 seconds, the test processing time in failure is 20 seconds and the number of CLI session is 6; the number of units of the core-network side OAM devices necessary for an existing system in which the processing time in the failure is set in the interval, is acquired as approximate 27 units calculated from (20 seconds×10000 units)/6 sessions/20 minutes× 60). In contrast, the number of necessary units in the system of the invention is acquired as approximate 3 units calculated from (2 seconds×10000 units)/6 sessions/(20 minutes×60), therefor, the number of units can be reduced drastically.

It should be further understood by those skilled in the art that although the foregoing description has been made on embodiments of the invention, the invention is not limited thereto and various changes and modifications may be made without departing from the spirit of the invention and the scope of the appended claims.

We claim:

1. A network system comprising:
   (i) a test device capable of testing a continuity and a performance within a network having a plurality of transfer devices; and
   (ii) a management server that requests an execution of the test for the test device, wherein
   the management server includes a control unit having a processor and being configured to:
   request a first execution of a first test for the test device via a first session, and
   request a second execution of a second test having been designated after the first test for the test device via a second session different from the first session in case that a response of a testing result of the first test is not received from the test device within a predetermined time period; and the test device includes a control unit that is configured to:
execute the first test or the second test in accordance with the first execution request or the second execution request received from the management server.

2. The system according to claim 1, wherein the second session is a backup session.

3. The system according to claim 2, wherein the control unit of the management server sets the second session in advance, as the backup session to be used for a transmission of the execution request for the second test in case that the response of the testing result of the first test is not received from the test device within the predetermined time period.

4. The system according to claim 2, wherein the control unit of the management server sets a transmission timing of the execution request for the test for every session.

5. The system according to claim 4, wherein the control unit of the management server sets, in the backup session, the transmission timing of the second execution request for the second test set at the transmission timing after the first execution request for the first test in the first session, in case that the response of the testing result of the first test is not received from the test device within the predetermined time period.

6. The system according to claim 2, wherein the control unit of the management server sets more than one session among the plurality of sessions as the backup session to be shared by plural test devices.

7. The system according to claim 4, wherein the test device is configured from a first test device that receives the first execution request for the first test from the management server, and a second test device to be addressed in a frame used for the test transmitted from the first test device, and
the control unit of the management server sets by a timing different from the transmission timing of the first execution request for the first test, in case that the transmission timing of a third execution request for a third test to be addressed to a third test device connected with the transfer device to be addressed in the frame used for the first test is set in the session.

8. The system according to claim 4, wherein the control unit of the management server calculates a probability, for every test, of when the response of the testing result is not received from the test device within the predetermined time period, to set the transmission timing of the execution request for a new test in accordance with the probability.

9. The system according to claim 4, wherein the control unit of management server sets a plurality of frames for setting the transmission timing of the execution request for the test for every session, and sets a transmission timing of the execution request for a new test in a frame succeeding to the plurality of frames having been set in case that the transmission timing of the execution request for the test is not set.

10. The system according to claim 8, wherein the control unit of management server sets a plurality of frames for setting the transmission timing of the execution request for the test for every session and sets the transmission timing in the frame in accordance with the probability of the test set in the frame immediately before the frame to be set the transmission timing of the execution request for a new test, when the transmission timing of the execution request for the new test is set in the frame.

11. A management server connected with a test device capable of testing a continuity and a performance of a network having a plurality of transfer devices to request an execution of the test for the test device, wherein
the management server comprises a control unit having a processor and being configured to:
request a first of a first test for the test device via a first session, and
request a second execution of a second test having been designated after the first test for the test device via a second session different from the first session, in case that a response of a testing result of the first test is not received from the test device within a predetermined time period.

12. The server according to claim 11, wherein the second session is a backup session.

13. The server according to claim 12, wherein the control unit sets the second session in advance, as the backup session to be used for a transmission of the second execution request for the second test in case that the response of the testing result of the first test is not received from the test device within the predetermined time period.

14. The server according to claim 12, wherein the control unit sets a transmission timing of the execution request for the test for every session.

15. The server according to claim 14, wherein the control unit sets, in the backup session, the transmission timing of the second execution request for the second test set at the transmission timing after the first execution request for the first test in the first session, in case that the response of the testing result of the first test is not received from the test device within the predetermined time period.

16. The server according to claim 12, wherein the control unit sets more than one session among the plurality of sessions as the backup session to be shared by plural test devices.

17. The server according to claim 14, wherein the test device is configured from a first test device that receives the first execution request for the first test from the management server, and a second test device to be addressed in a frame used for the test transmitted from the first test device, and
the control unit sets by a timing different from the transmission timing of the first execution request for the first test, in case that the transmission timing of a third execution request for a third test to be addressed to a third test device connected with the transfer device to be addressed in the frame used for the first test is set in the session.

18. The server according to claim 14, wherein the control unit calculates a probability, for every test, of when the response of the testing result is not received from the test device within the predetermined time period, to set the transmission timing of the execution request for a new test in accordance with the probability.

19. The server according to claim 14, wherein the control unit sets a plurality of frames for setting the transmission timing of the execution request for the test for every session, and sets a transmission timing of the execution request for a new test in a frame succeeding the plurality of frames having been set in case that the transmission timing of the execution request for the test is not set.

20. The server according to claim 18, wherein
the control unit sets a plurality of frames for setting the transmission timing of the execution request for the test for every session and sets the transmission timing in the frame in accordance with the probability of the test set in the frame immediately before the frame to be set the transmission timing of the execution request for a new test, when the transmission timing of the execution request for the new test is set in the frame.

* * * * *